US010019070B2

(12) United States Patent
Szczerba et al.

(10) Patent No.: US 10,019,070 B2
(45) Date of Patent: Jul. 10, 2018

(54) VEHICLE-WEARABLE DEVICE INTERFACE AND METHODS FOR USING THE SAME

(71) Applicant: GM Global Technology Operations LLC, Detroit, MI (US)

(72) Inventors: Joseph F. Szczerba, Grand Blanc, MI (US); Roy J. Mathieu, Rochester Hills, MI (US); Roger L. Hersberger, Novi, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 15/341,738

(22) Filed: Nov. 2, 2016

(65) Prior Publication Data

US 2017/0123503 A1 May 4, 2017

Related U.S. Application Data

(60) Provisional application No. 62/250,184, filed on Nov. 3, 2015.

(51) Int. Cl.
| | |
|---|---|
| *G06F 3/01* | (2006.01) |
| *G06F 3/0346* | (2013.01) |
| *B60R 16/023* | (2006.01) |
| *B60K 35/00* | (2006.01) |
| *B60K 37/06* | (2006.01) |
| *G02B 27/01* | (2006.01) |

(52) U.S. Cl.
CPC .............. *G06F 3/017* (2013.01); *B60K 35/00* (2013.01); *B60K 37/06* (2013.01); *B60R 16/023* (2013.01);

(Continued)

(58) Field of Classification Search
CPC ....... B60R 16/023; G06F 3/016; G06F 3/017; G06F 1/163; G06F 3/0346; G02C 11/06;
(Continued)

(56) References Cited

U.S. PATENT DOCUMENTS

| 8,159,324 B2* | 4/2012 | Zellweger | G07C 9/00309 340/12.28 |
|---|---|---|---|
| 8,417,419 B2* | 4/2013 | Lefaure | B62H 5/06 70/186 |

(Continued)

OTHER PUBLICATIONS

ABI Research, "In-Vehicle Wearable Integration to Accelerate Convergence; Global Penetration in New Cars to Exceed 90% by 2019", https://abiresearch.com/in-vehicle-wearable-integration-tp-accelerate-conv/, Feb. 4, 2014.

(Continued)

*Primary Examiner* — Russell Frejd
(74) *Attorney, Agent, or Firm* — Cynthia R. Parks; Parks IP Law LLC (57) ABSTRACT

A transportation vehicle system, for providing feedback to a user-worn wearable device, including a hardware-based processing unit and a hardware-based computer-readable storage device. The device includes a vehicle-function identification module that, when executed by the processing unit determines that a trigger condition has occurred. The vehicle-function identification module also determines, for responding to the trigger condition, a wearable-communication function including transmitting a vehicle signal to the wearable device. An activation module causes the processing unit to initiate transmitting the vehicle signal to the wearable device. The technology also in various embodiments includes the vehicle storage device, the wearable device, a storage unit of the wearable device, and processes including any of the operations disclosed herein.

12 Claims, 6 Drawing Sheets

(52) U.S. Cl.
CPC .......... *G02B 27/017* (2013.01); *G06F 3/016* (2013.01); *G06F 3/0346* (2013.01); *B60K 2350/1004* (2013.01); *B60K 2350/1052* (2013.01); *B60K 2350/352* (2013.01); *B60K 2350/357* (2013.01); *G02B 2027/014* (2013.01); *G02B 2027/0138* (2013.01); *G02B 2027/0178* (2013.01); *G02B 2027/0187* (2013.01)

(58) Field of Classification Search
CPC ............... B60K 35/00; B60K 37/06; B60K 2350/1004; B60K 2350/1052; B60K 2350/352; B60K 2350/357; G02B 2027/0178; G02B 2027/0138; G02B 2027/014; G02B 2027/0187; G02B 27/017
See application file for complete search history.

(56) References Cited

U.S. PATENT DOCUMENTS

| | | | | |
|---|---|---|---|---|
| 2011/0125370 | A1* | 5/2011 | Lefaure | B62H 5/06 701/41 |
| 2014/0240132 | A1* | 8/2014 | Bychkov | A61B 5/18 340/576 |
| 2014/0267035 | A1 | 9/2014 | Schalk et al. | |
| 2014/0309852 | A1* | 10/2014 | Ricci | H04W 48/04 701/34.4 |
| 2014/0310186 | A1* | 10/2014 | Ricci | H04W 48/04 705/302 |
| 2014/0371955 | A1 | 12/2014 | Vaghefinazari et al. | |
| 2015/0039877 | A1 | 2/2015 | Hall et al. | |
| 2015/0081169 | A1 | 3/2015 | Pisz | |
| 2015/0116078 | A1* | 4/2015 | Mishra | G07C 9/00007 340/5.51 |
| 2015/0249976 | A1* | 9/2015 | Melzer | H04W 4/025 370/329 |
| 2015/0362997 | A1* | 12/2015 | Hatton | G06F 3/017 701/2 |
| 2016/0274621 | A1* | 9/2016 | Meyer | B29C 39/021 |

OTHER PUBLICATIONS

Chantal Tode, "Automakers Push Envelope on Wearables, Augmented Reality Despite Regulatory Concern", http://www.mobilemarketer.com/cms/news/software-technology/17152.html, Feb. 10, 2014.

\* cited by examiner

Fig_1

Fig_2

Fig_3

Fig_4

Fig_5

Fig. 7

VEHICLE-WEARABLE DEVICE INTERFACE AND METHODS FOR USING THE SAME

TECHNICAL FIELD

The present disclosure relates generally to vehicle-user interactions and, more particularly, to systems and methods enhancing vehicle-user interactions using a user-wearable device.

BACKGROUND

Modern vehicles have many electronic features promoting convenience and safety. An example is vehicle unlock, actuatable by button press at a portable keyfob or vehicle-mounted keypad. Users save time by not having to enter a traditional key into the vehicle.

Another recent vehicle feature is kick-activated tailgates, wherein one or more under-vehicle sensors trigger opening of the tailgate when sensing a user foot kicked beneath a rear bumper of the vehicle.

While such developments have made vehicle use more convenient, there remains many opportunities to improve vehicle-user interactions.

SUMMARY

The systems and methods of the present disclosure allow users to interact with a vehicle using a wearable device.

In various embodiments, the systems allow the user to receive vehicle feedback by way of the wearable device. Feedback includes, for example, a haptic feedback, provided by way of the wearable device and indicating a corresponding vehicle function, such as driving directions.

The term smart can be used to refer to wearable devices of the present technology. The term can refer to a variety of characteristics, such as, simply, the wearable device having electronic structure and functionality.

In some cases the device is smart by being computerized, or by having a controller or processing features and/or by having a memory device including instructions executable by a processor.

Example smart wearable devices includes sunglasses or other eyeglasses, a bracelet, a ring, cufflink, belt attachment, shoe or boot (footwear) attachment, legwear, arm wear, clothing, watch, earrings, earbuds, earphones, headset, hat or other headwear, and a ring.

Figure 7:
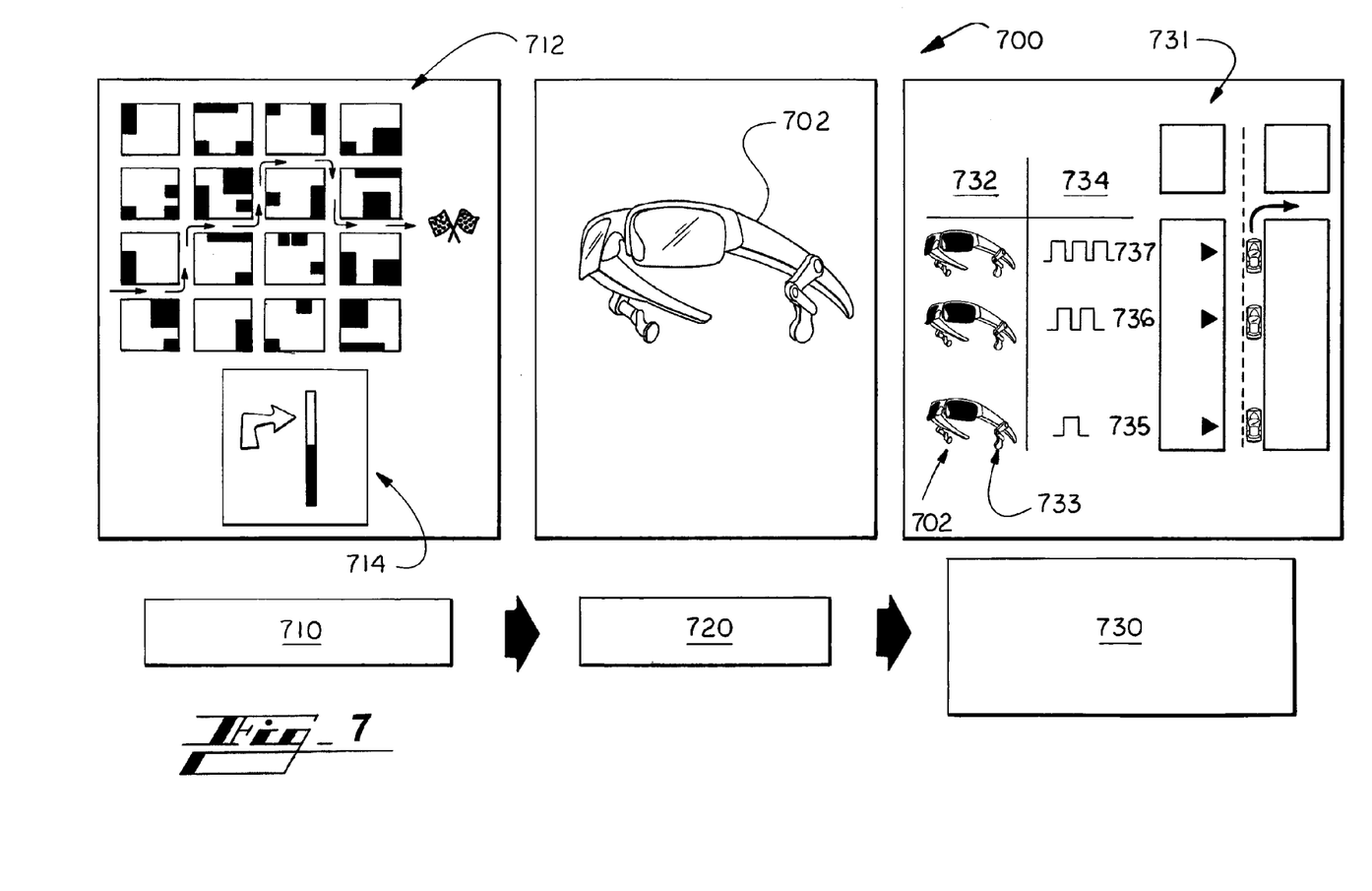
FIG. 7 shows another example implementation, involving smart sunglasses.

Smart sunglass, such as those shown in FIG. 7, can be configured to, for example, vibrate on a right side at a low frequency and/or low amplitude when a right turn is required soon according to a navigation system operating in the sunglasses or vehicle, and vibrate at a higher frequency and/or amplitude as the turn approaches. With or without glasses, a smart wearable head device can include one or two ear speakers (e.g., earbuds or earrings), as shown in FIG. 7.

As shown, the vehicle may determine that the user should be advised of something having a right or left-sided focus. In some embodiments, the output to the user is handed, or provided at purposeful spatial context, such as by providing a vibration or tone to a right template portion of eyeglasses if the hazard or situation—e.g., direction of needed turn per navigation—being advised of is toward the right of the user.

The arrangement can also consider spatial context outside of left/right, such as fore/aft. If a hazard is behind the car, the vehicle signal may be configured to cause wearable eyeglasses to provide vibration at the temples, and to cause the frame portions to provide the vibration if the hazard is in front.

Similarly, for example, smart earrings or smart earbuds, whether part of eyeglasses, can be configured to provide vibration in the same way.

Or smart earrings or smart earbuds can be configured to, in connection with navigation operations, provide sound, such as gentle beeps, at a low tempo and/or low volume when a right turn is required soon, and sound at a higher tempo and/or higher volume as the turn approaches.

In addition to haptic and audio outputs to the user via the wearable device, the wearable and vehicle can be configured to provide other types of communications to the user, such as visual. As an example, smart glasses can present a light or message on the lens. In contemplated embodiments the output can include text, images, icons, or the like, such as provided via a lens of smart glasses or smart bracelet.

In some embodiments, the smart wearable can be used to confirm to the user that an instruction provided by the user to the vehicle, such as by gesture, was in fact received at the vehicle. For instance, haptic feedback can be provided to indicate whether a user-to-vehicle input, such as an in-vehicle user gesture, was received properly by the vehicle.

The term gesture is not used in a limited sense and can include any user movement.

The user gesture, such as a gesture to select an infotainment app of the vehicle, can be sensed by the vehicle, or by the wearable and communicated to the vehicle. And the vehicle can return to the wearable a signal confirming receipt of the gesture, and the wearable actuate to provide the confirmation (e.g., audio, haptic) to the user. These types of embodiments can be helpful by avoiding the user wondering if their gesture was registered by the vehicle, and so avoid the user feeling that they may need to repeat the gesture again, and again.

Figure 3:
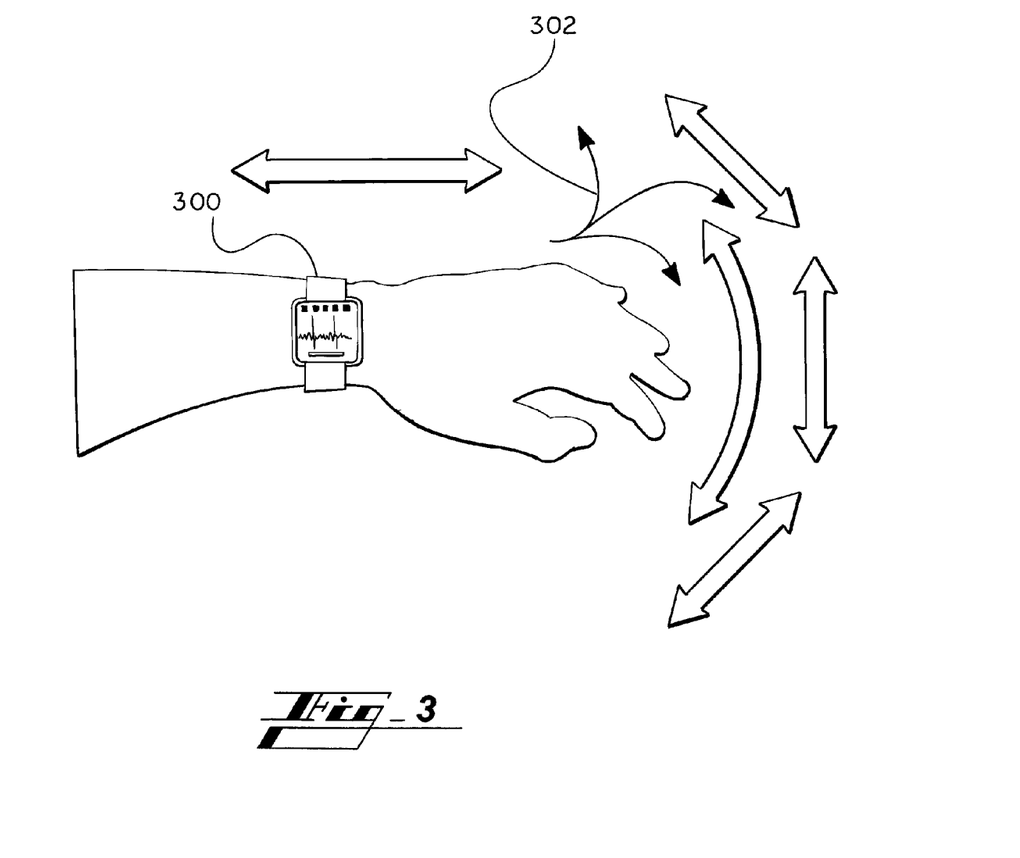
FIG. 3 shows an example wearable device worn by a user.
Figure 6:
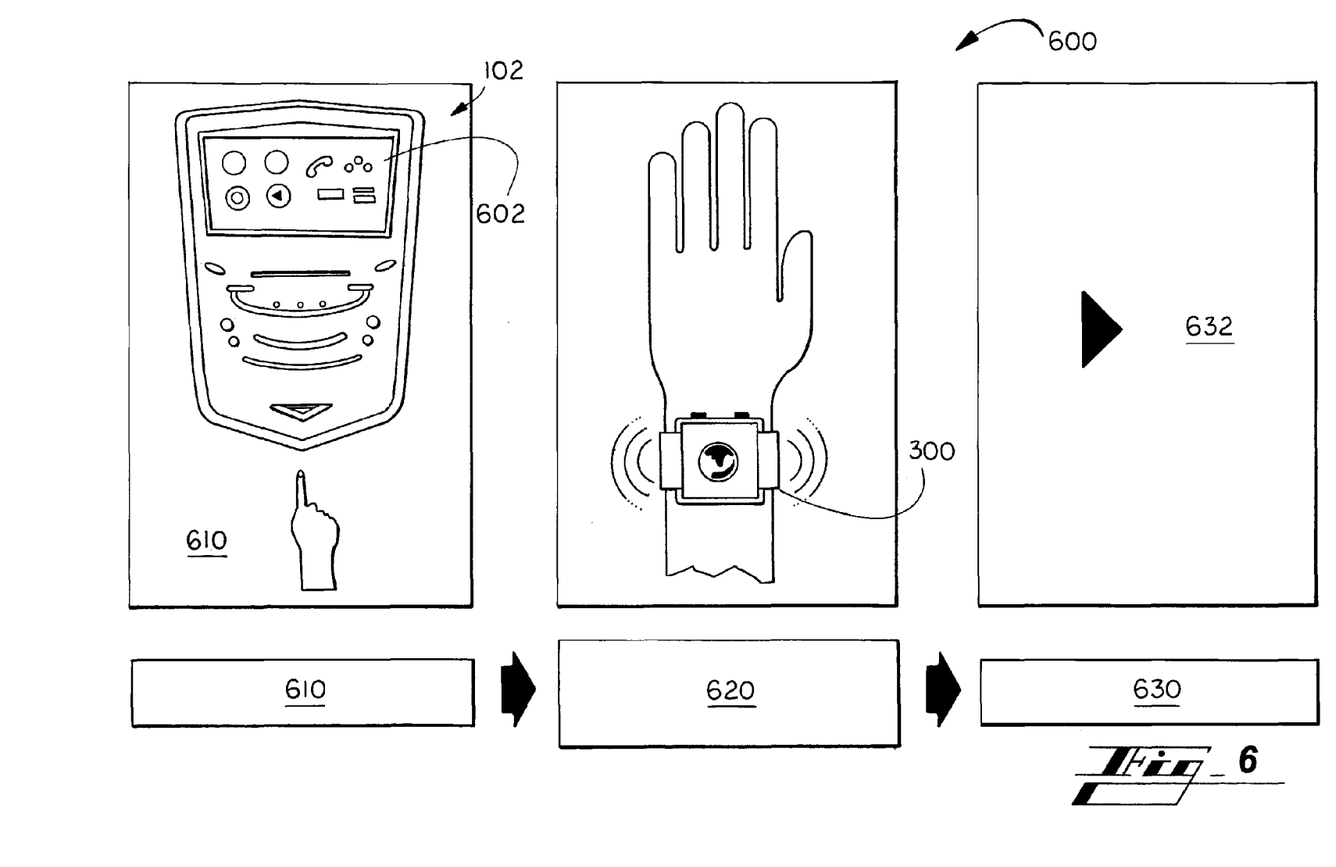
FIG. 6 shows an example implementation, involving a wrist-mounted wearable device.

As an example, a smart bracelet, ring, wristband, cufflink, necklace, hat, shirt, or watch, such as the example smart bracelet, wristband, or watch of FIGS. 3 and 6, can be configured to vibrate in response to a vehicle signal indicating that a user gesture made to communicate a user instruction to the vehicle, was indeed received by and is being acted on by the vehicle.

The wearable device is configured, in various implementations, to participate in short, medium, and/or long-range communications. The wearable device may wireless communicate with devices such as the vehicle or other wireless apparatus, such as cellular towers, satellites, road-side beacons, etc. The wearable device in some cases accesses any of a variety of communication networks, such as the Internet, in operation of the system.

Communications can be sent to or received from a remote system, such as to a remote call or control center, like the OnStar® system. Such centers have facilities for interacting with vehicle agent team members and their user team members via long-range communications, such as satellite or cellular communications. OnStar is a registered trademark of the OnStar Corporation, which is a subsidiary of the General Motors Company.

The vehicle is configured in some embodiments to sense and respond to wearable-device movement performed while the device is being moved outside of the vehicle, and also movement performed while inside of the vehicle.

The vehicle is in various embodiments configured to sense presence of, or determine presence based on signals received from, a wearable device worn by the user.

The wearable device is configured, in some embodiments, to send various signals to the vehicle based on user motions involving the wearable device. A first motion of a user arm bearing a smart watch can cause the smart watch to, in response to the first motion, send a first corresponding signal to the vehicle—to, for instance, select a particular infotainment app at the vehicle—and a second motion of the user arm having the smart watch can cause the watch to, in response to the second motion, send to the vehicle a second corresponding signal, distinct from the first signal, to, for instance, initiate selection of a particular piece of media that is available by way of the infotainment app selected by the first motion.

The vehicle is configured in some embodiments to sense and respond to user body movements, such as but not limited to hand or arm gestures, even without use of a smart wearable device. The vehicle can be configured to sense the user movement in any of various suitable manners, such as by using one or more of a vehicle camera, RADAR, or other sensor(s). The vehicle can be configured to, in response to a first motion of a user hand or arm, for instance, cause the vehicle to perform a first corresponding function and in response to a second motion of the user hand or arm, perform a second corresponding function.

The present technology promotes more convenient and safer vehicle use. The system may be configured to advise the user immediately, in real-time, by way of a wearable device actuation—e.g., vibration—confirming that one or more user gestures—such as a pointing to an HVAC temperature component (first motion) and then swiping down (second motion) to lower temperature—were received and recognized by the vehicle. The technology promotes safety in this scenario by obviating a need or inclination by the user to repeat the input motion over and over, as is common with users when unsure of whether their input was received by an electronic device.

In a contemplated embodiments, a communication is provided to the user to confirm to the user that they have engaged the gesture recognition program of the wearable device and/or vehicle. In the radio example, for instance, after a user directs their finger or hand toward the radio, and perhaps after they hold it generally in that disposition for a second or two (depending on the system programming or user preference added thereto), the system will give a gentle output—e.g., vibration, tone, etc.—to advise the user that the gesture recognition is engaged and has recognized their hand. Thereby, the user proceeds to perform the gesture with confidence knowing that they system is monitoring their gesture.

The technology in various embodiments promotes safety by allowing the user to communicate in less obtrusive ways, such as by the user, without having to take their eyes off of the road, being able to (1) gesture generally but sufficiently to communicate with the vehicle to give instructions, (2) to receive instructions, such as navigation feedback indicating that a left or right turn is needed soon, or that a turn was missed, and (3) to receive confirmation of system receipt of a user instruction provided to the vehicle by gesture or otherwise.

Other aspects of the present invention will be in part apparent and in part pointed out hereinafter.

DESCRIPTION OF THE DRAWINGS

The figures are not necessarily to scale and some features may be exaggerated or minimized, such as to show details of particular components.

DETAILED DESCRIPTION

I. Introduction

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

In some instances, well-known components, systems, materials or methods have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

The systems of the present disclosure include specially configured vehicle apparatus and, in some embodiments, specially configured wearable user devices.

Vehicle apparatus include any of select sensors and/or communication receivers for receiving user inputs, specially programmed computing components for determining vehicle functions corresponding to user inputs, and output components for activating the vehicle functions identified.

Wearable devices are configured to receive vehicle signals from the vehicle, and communicate correspondingly with the user, such as by providing a haptic communication to the user. The vehicle apparatus is configured to provide the vehicle signals to the wearable device.

The wearable device is in some embodiments configured to sense a user gesture and send a corresponding user-gesture signal to the vehicle. In some embodiments, the vehicle is configured to receive signals from the wearable device, such as the user-gesture signal indicating a gesture made by the user.

More convenient and safer vehicle use us promoted by the present technology. Safety is promoted, for instance, by the user being advised immediately, in real-time (e.g., by wearable device vibration) that their gesture (e.g., pointing to a HVAC temperature component) was received and recognized by the vehicle, obviating a need or inclination by the user to repeat the input action (e.g., gesture) as is common when a user is not sure whether their input was received by the vehicle. Safety can also be promoted, as another example, by the user not needing to take their eyes off of the road to get feedback, such as navigation feedback indicating that a left or right turn is needed soon, or that a turn was missed.

While the present technology is described primarily herein in connection with automobiles, the technology is not limited by the focus. The concepts can be extended to a wide variety of applications, such as aircraft, marine craft, manufacturing machines or equipment, home appliances, the like, and other.

Figure 1:
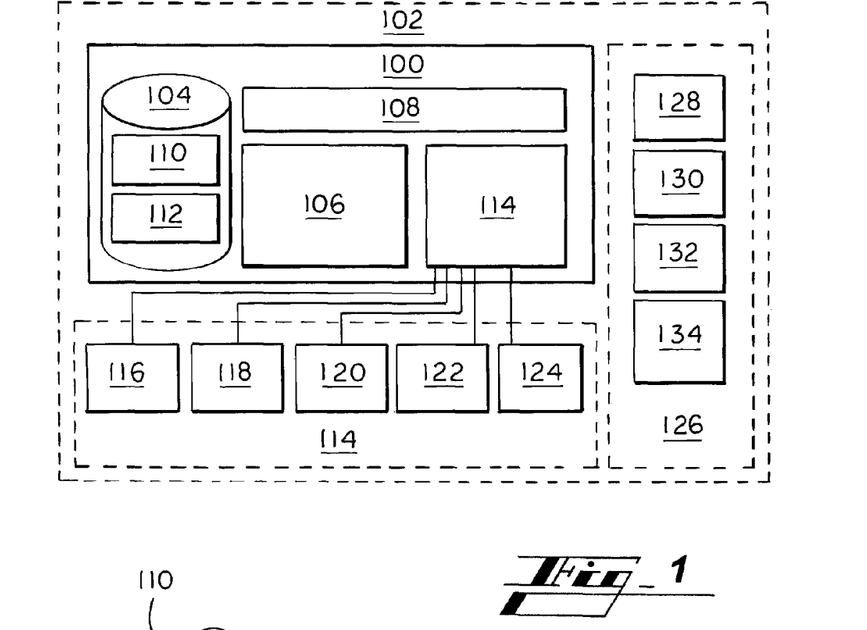
FIG. 1 illustrates schematically illustrates a computer architecture, according to various embodiment of the present disclosure.
Figure 2:
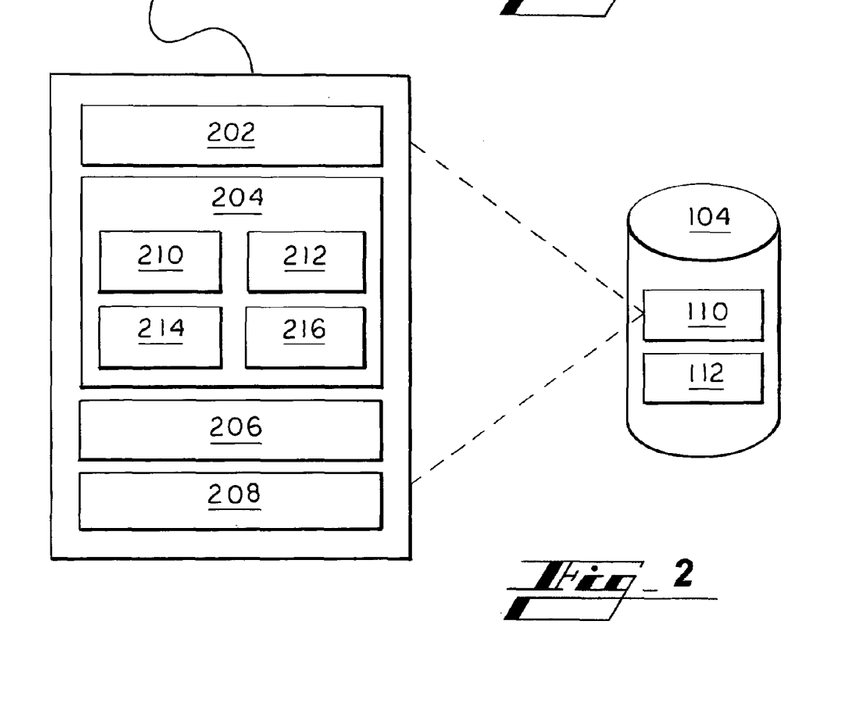
FIG. 2 shows example memory components of the computer architecture of FIG. 1.

First example systems are now described, and shown schematically, in connection with FIGS. 1 and 2.

II. On-Board Computing Architecture—FIG. 1

Turning now to the figures and more particularly the first figure, FIG. 1 illustrates a computer-based system 100, such as an on-board computer (OBC) of a vehicle 102 such as an automobile.

In a contemplated embodiment, some or all of the system 100 is positioned at a remote call or control center, like the mentioned OnStar® system.

As described more below, the computer-based system 100 of FIG. 1 can also be a model for other electronic systems of the present technology, such as of a computing system of a user wearable device.

In the present section, the computer-based system 100 is described primarily as an OBC. The OBC 100 can be, or be a part of, a primary computing unit of the vehicle 102, such as an electronic control unit (ECU) of the vehicle 102.

The OBC 100 includes a computer-readable storage medium, or data storage device 104, and a processing hardware unit 106 connected or connectable to the computer-readable storage device 104 by way of a communication link 108, such as a computer bus.

The processing hardware unit 106 can include or be multiple processors, which could include distributed processors or parallel processors in a single machine or multiple machines. The processing hardware unit can be used in supporting a virtual processing environment. The processing hardware unit could include a state machine, application specific integrated circuit (ASIC), programmable gate array (PGA) including a Field PGA, or state machine. References herein to the processing hardware unit executing code or instructions to perform operations, acts, tasks, functions, steps, or the like, could include the processing hardware unit performing the operations directly and/or facilitating, directing, or cooperating with another device or component to perform the operations.

In various embodiments, the data storage device is any of a volatile medium, a non-volatile medium, a removable medium, and a non-removable medium. The term computer-readable media and variants thereof, as used in the specification and claims, refer to tangible storage media. The media can be a device, and can be non-transitory.

In some embodiments, the storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The data storage device 104 includes one or more storage modules storing computer-readable instructions executable by the processor 106 to perform the functions described herein.

For instance, the data storage device 104 includes team-based vehicle-machine framework modules 110. The data storage device 104 in some embodiments also includes ancillary or supporting components 112, such as additional software and/or data supporting performance of the methods of the present disclosure.

The vehicle 102 also includes a communication sub-system 114 for communicating with external devices. The vehicle 102 communicates, by way of the communication sub-system 114 with, for instance, the internet, to obtain media for navigation or infotainment, which in various implementations can be selected by the user by way of gesture, whether by way moving a worn device, or simply by body movement.

In various embodiments, the extra-vehicle or external devices to which the OBC 100 communicates in execution of the functions of the present technology, can include a remote control center. The control center can be the control center of the OnStar® system mentioned.

The communication sub-system 114 in various embodiments includes a wire-based input/output (i/o) 116, at least one long-range wireless transceiver 118, and at least one short-range wireless transceiver 120. Two other ports 122, 124 are shown by way of example to emphasize that the system can be configured to accommodate other types of wired or wireless communications.

The vehicle 102 also includes a sensor sub-system 126 comprising sensors providing information to the OBC 100, such as information indicating presence and movement of a proximate vehicle user. The vehicle 102 can be configured so that the OBC 100 communicates with, or at least receives signals from sensors of the sensor sub-system 122, via wired or short-range wireless communication links 116, 120.

In some embodiments, the sensor sub-system 126 includes at least one camera 128 and at least one range sensor 130. Range sensors, used typically in support of driving functions, can include a short-range radar (SRR), an ultrasonic sensor, a long-range RADAR, such as those used in autonomous or adaptive-cruise-control (ACC) systems, or a Light Detection And Ranging (LiDAR) sensor.

The camera 128 shown schematically can represent one or multiple cameras positioned in any appropriate location of the vehicle 102, such as at vehicle side mirrors, adjacent or at door handles, at a rear decklid, facing out from vehicle head and/or tail lamps, etc. Each camera 128 is configured to sense presence of a user and, in some embodiments, user motion. Each can be movable, such as by being movable automatically by an actuator controlled by the computer system 100 to track motion of a user moving in or near the vehicle. Cameras can be used in conjunction with other sensors, such as laser-motion detecting sensors, to recognize user gestures.

One or more of the sensors sensing user motion are in various embodiments oriented primarily in any of a variety of directions. For example, cameras 128 and radar 130 may be oriented at each, or a select, position of, for example: (i) facing forward from a front center point of the vehicle 102, (ii) facing rearward from a rear center point of the vehicle 102, (iii) facing laterally of the vehicle from a side position of the vehicle 102, and (iv) facing diagonally—e.g., between fore and directly laterally—of the vehicle 102.

The long-range transceiver 118 is in some embodiments configured to facilitate communications between the OBC 100 and a satellite and/or a cellular telecommunications network. The short-range transceiver 120 is configured to facilitate short-range communications, such as communications with other vehicles, in vehicle-to-vehicle (V2V) communications, communications with transportation system infrastructure (V2I), or other systems (V2X), such as local communication routers.

To communicate V2X etc., the short-range communication transceiver 120 may be configured to communicate by way of one or more short-range communication protocols.

Example protocols include Dedicated Short-Range Communications (DSRC), WI-FI®, BLUETOOTH®, infrared, infrared data association (IRDA), near field communications (NFC), the like, or improvements thereof (WI-FI is a registered trademark of WI-FI Alliance, of Austin, Tex.; BLUETOOTH is a registered trademark of Bluetooth SIG, Inc., of Bellevue, Wash.).

Other sensor sub-systems 126 include an inertial-momentum unit (IMU) 132, used mostly in support of autonomous driving functions, such as one having one or more accelerometers, and/or other such dynamic vehicle sensors 134, such as a wheel sensor or a sensor associated with a steering system—e.g., steering wheel—of the vehicle 102.

III. Data Storage and Example Wearable Devices—FIGS. 2 and 3

FIG. 2 shows in more detail the data storage device 104 of FIG. 1. The components of the data storage device 104 are now described further with reference to the figure.

III.A. Memory Components

As provided above regarding FIG. 1, the data storage device 104 includes one or more modules 110. And the memory may also include ancillary components 112, such as additional software and/or data supporting performance of the methods of the present disclosure.

The ancillary components 112 can include, for example, one or more user profiles. The profiles can including settings, default and/or custom set, for one or more users (e.g., human drivers) of the vehicle. These and other data components are described elsewhere, herein, including below in connection with the methods 400, of operation. The technology can be personalized, or customized in these ways.

The modules 110 can include at least three (3) modules 202, 204, 206, describe further in the next section. In one embodiment, the modules 110 include one or more additional modules. Some instructions can be part of more than one module, and functions described herein can be performed by processor execution of the corresponding more than one module.

Functions described herein, but not in connection expressly with one of the three modules 202, 204, 206 can be a part of one of the three modules and/or a part of an additional supporting module or modules 208. The supporting module(s) 208 can include, for example, a user-identification module and/or a passenger-identification module.

Each of the modules can be referred to by any of a variety of names, such as by a term or phrase indicative of its function. The modules 202, 204, 206 of the present system 100 can be referred to as a user-gesture determination module 202, a vehicle-function identification and activation module 204, and a vehicle-to-wearable communication module 206, or the like, for example.

FIG. 2 shows an additional module by reference numeral 208 to indicate schematically that the system 100 can include one or more additional modules.

Any of the modules can include sub-modules, such as shown by reference numerals 210, 212, 214, 216 in connection with the second illustrated module 204 of FIG. 2. Sub-modules can perform specific operations or routines of module functions.

III.A.i. User-Gesture Determination Module 202

The processing hardware unit 104, executing the user-gesture determination module, determines, based on user input data, what gesture a user is making or has made. The user input data can include one or multiple data components. The user input data can be received at the processing hardware unit 106, executing the module 202, from one or more of a variety of data sources.

Example data sources include one or more sensors of a wearable device, of the vehicle 102, and/or local infrastructure (e.g., parking lot camera) configured and arranged to sense motion of one or more user body parts, such as a user head, arm, wrist, hand, or finger.

Example gestures include the user pointing to an infotainment app icon displayed at a vehicle display screen. An example of pointing 601 is shown regarding a vehicle display screen 602 in FIG. 6.

Or the user could point to a radio system, such as a radio interface of the vehicle, and then, in the air, without actually contacting the radio system, turn the user hand to simulate turning a knob, or swipe in the air slowly, to indicate a desire to change a radio station.

As another example, the user could point to a heating-ventilating, and air-conditioning (HVAC) system, such as temperature interface of the vehicle, then in the air, without actually contacting the HVAC system, turn the user hand to simulate turning of a knob, or swipe upward or downward in the air slowly, to indicate a desire to increase or decrease HVAC output temperature.

The user wearable device can be a computerized, or electronic, device having any of the components shown in FIGS. 1 and 2—e.g., memory comprising instructions and a processor for executing the instructions. FIGS. 1 and 2 can thus be considered to, in addition to showing vehicle features, also, from another perspective show wearable-device features. The figures are not shown again, separately, for the wearable device perspective in the interest of brevity.

With continued reference to FIG. 3, example user gestures or movements 302 include rotations in any direction, linear movements, and combinations of rotation and linear movement of a subject user body part—e.g., head, arm, wrist, hand, or finger. Rotations can include twists, such as a twist of the wrist. The rotations can also include movements causing the wearable device to travel along larger arcs, such as generally about a user elbow, as would occur if the user was making a waving motion. Linear motions can include the user moving their hand, and so wrist, straight down, such as an exaggerated motion of grabbing or poking an imaginary icon corresponding to an actual icon (e.g., an infotainment app icon or infotainment media icon) displayed by the vehicle.

In a contemplated embodiment, the sensors can include a sensor of a wearable device 300. For instance, the user can wear a device—on a left wrist, around the neck (e.g., pendant, necklace), earring, ring, cufflink(s), belt attachment, shoe or boot (footwear) attachment, legwear, arm wear, clothing, headphones, headgear, hat or other headwear, rings, eyeglasses, sunglasses, etc.—configured to sense and report on (send a signal to the vehicle) motion of the right arm or hand. In a contemplated embodiment, the device 300 is not technically worn by the user, but held by the user, such as a user mobile phone. In a contemplate embodiment, the wearable, or other user device, is configured with at least one sensor, such as a RADAR based motion detector, to detect user movements, such as the watch 300 detecting finger movements, such as while the wrist and lower arm are not moving.

Other contemplate motions include an arm motion whereby the user simulate pushing, tossing, or throwing an imaginary something (e.g., knob, slide, text message) toward the vehicle, corresponding to a vehicle function (e.g., sending a text message), or pulling something from the vehicle corresponding to another vehicle function (e.g., opening an infotainment app folder).

While a wrist-mounted wearable device 300 in FIGS. 3 and 6, and smart glasses 702 in FIG. 7, the wearable device need not be configured to be worn on the wrist or head. And as referenced, the system(s) some embodiments record—e.g., vehicle sensor(s) sense—user gestures even though the user is not wearing a device 300. The wearable device is in various embodiments configured to receive signals or messages from the vehicle. In various embodiments, the wearable device includes transmitter or transceiver components for at least sending signals or messages to the vehicle, such as signals or messages corresponding to user gestures.

As provided, the data source in various includes one or more sensors configured to sense motion of a user body part such as a wrist, arm, or hand.

The sensors can include those described above in connection with the sensor sub-system 126 of the system 100 of FIG. 1, such as at least one camera 128.

In a contemplated embodiment, the device 300 is not technically worn by the user, but held by the user, such as a user mobile phone.

The wearable device can include any appropriate components for sensing user gestures or movement, such as camera components, an inertial-momentum unit (IMU)—such as that indicated by 132 for the interpretation by which the system 100 of FIG. 1 shows the device 300—such as one having one or more accelerometers.

In some embodiments, or at least for some system operation, determination of a user gesture is not required. A user gesture is not part of an operation, for instance, for implementations in which the vehicle sends a signal to the wearable device to indicate to the user (e.g., by vibrating a right side of a pair of smart sunglasses) that a turn in a navigation route being followed is needed soon.

III.A.ii. Vehicle-Function ID and Activation Module 204

The processing hardware unit 106, executing the vehicle-function identification and activation (VFIA) module 204, determines a vehicle function including providing a signal or message to the wearable device to be processed and communicated to the user. While the structure transmitted can include a signal, message, or other communication, the structure is referred to herein simply as a signal, not to limit interpretation, unless provided for expressly, and to include any of the structure types, in the interest of brevity.

For embodiments or implementations in which a gesture is analyzed using the prior module 202, the VFIA module can cause the processor to determine functions, including sending an appropriate signal to the wearable device, and perhaps executing other actions—such as opening an infotainment app, accessing a particular piece of media (e.g., song), turning up a volume or HVAC fan, etc.—corresponding to the gesture identified by the processing hardware unit 106 executing the user-gesture determination module 202.

As provided, any of the modules 202, 204, 206, 208 can include sub-modules. Each of the sub-modules can be referred to by any of a variety of names, such as by a term or phrase indicative of its function.

As an example, the vehicle-function identification module 204 can include sub-modules 210, 212, 214, 216

The first sub-module 210 can be referred to as a look-up module, such as a data structure comprising a table correlating each of multiple pre-set user gestures—e.g., a hand wave, hand point, head nod or tilt—to respective vehicle functions—e.g., blink vehicle lights.

The second sub-module 212 can be referred to as a user-profile module. The U-P module 212 can include user preferences set by the user, such as preferred gestures and associated vehicle functions, wherein the preferred gestures differ from standard, or default, gestures associated originally with the vehicle functions.

In some implementations, the operations of the first module 202 use the U-P module 212. The U-P module can be a part of the first module 202 instead or along with being in the second module 204.

The third, vehicle-function initiation/activation (VFIA) module 214 can include instructions causing the processing hardware device 106 to, based on the vehicle function identified using the look-up module 210, initiate vehicle performance of the relevant function.

The initiation can include, for instance, the processing hardware unit 106, executing instructions of the VFIA module 214 generating and transmitting a signal configured to cause the vehicle to perform the function. The signal can be transmitted to the primary electronic control unit (ECU) of the vehicle 102, for instance, or a different part of the OBC 100, whether the OBC is a part of the ECU.

The signal generated and sent, or selected and sent, or simply transmitted, can indicate details for the type of output to be provided by the wearable device to the user, such as that a left over-the-ear piece of an eyeglasses-type wearable device should vibrate to indicate that a left turn of the vehicle is needed soon according to a route of a navigation system at the vehicle.

Other example output details, indicated by the vehicle signal, include a timing and/or level of output. As mentioned, smart sunglass—see e.g., FIG. 7—can be configured to, in response to the signal, vibrate on a right side at a lowest frequency and/or amplitude when a right turn is required soon according to a navigation system in the sunglasses or vehicle, and vibrate at one or more higher frequencies and/or amplitudes as the turn approaches.

The signal is in some implementations configured for processing by a smart hearing device, such as smart earbuds, whether part of sunglasses—again, structure like that of FIG. 7, only by way of example—or smart earrings, configured to, responsive to the signal, provide sound—gentle beeps, for instance—at a lowest frequency and/or amplitude when a right turn is required soon, and sound at one or more higher frequencies and/or amplitudes as the turn approaches.

The signal is in some implementations configured for processing by a smart bracelet, wristband, ring, cufflink, or watch—see e.g., FIGS. 3 and 6 regarding bracelet, wristband, or watch—or other wearable device can be configured to, responsive to the signal, to indicate that a user gesture just made, for communicating with the vehicle—e.g., pointing to an infotainment app—was indeed received by and is being acted on by the vehicle.

The fourth sub-module 216 is shown to indicate that any of the modules can include one or more additional sub-modules.

III.A.iii. Vehicle-to-Wearable Communication Module 206

The processing hardware unit 106 executing the vehicle-to-wearable communication module 206 performs the function(s) identified by the unit 106 executing the prior modules 202, 204—e.g., open an infotainment app or select a particular pieces of infotainment media indicating the media.

The functions in various embodiments include transmitting a signal to the wearable device (e.g., 300) to communicate with the user. The signal indicates that the device should, or the signal otherwise triggers the device to, provide output detectable by the user. Example output includes a haptic or audible stimuli, such as vibrations, tones, or words.

The wearable device responds to the signal, accordingly. For instance, the signal can indicate details for the type of output to be provided by the wearable device to the user, such as that a left over-the-ear piece of an eyeglasses-type wearable device should vibrate to indicate that a left turn of the vehicle is needed soon according to a route of a navigation system at the vehicle.

Other example output details, indicated by the vehicle signal, include a timing and/or level of output. As mentioned, smart sunglass—see e.g., FIG. 7—can be configured to, in response to the signal, vibrate on a right side at a low frequency and/or low amplitude when a right turn is required soon according to a navigation system in the sunglasses or vehicle, and vibrate at one or more higher frequencies and/or amplitudes as the turn approaches.

Or hearing-based smart wearable device, such as earbuds, whether part of sunglasses (again, structure like that of FIG. 7, only by way of example), can be configured to, responsive to the signal, provide sound (e.g., gentle beeps) at a low tempo and/or low volume when a right turn is required soon, and sound at a higher tempo and/or a higher volume as the turn approaches.

A smart bracelet, wristband, ring, cufflink, or watch—see e.g., FIGS. 3 and 6 regarding bracelet, wristband, or watch—or other wearable device can be configured to, responsive to the signal, to indicate that a user gesture just made, for communicating with the vehicle—pointing to an infotainment app, for instance—was indeed received by and is being acted on by the vehicle.

In some implementations, in which the OBC 100 is not a part of a vehicle ECU, the third module 206 is a part of the ECU.

IV. Example Methods of Operation—FIG. 4

Figure 4:
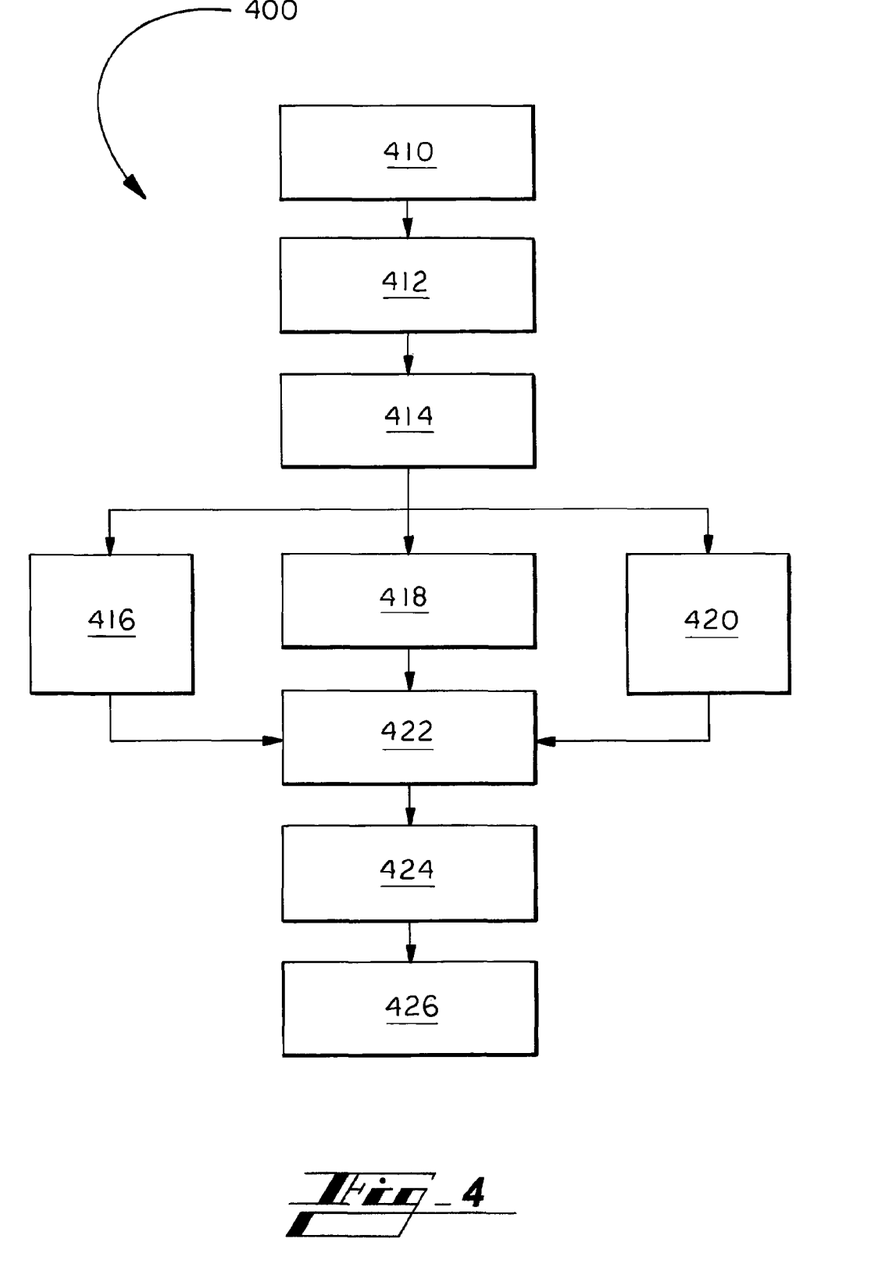
FIG. 4 shows an example method according to embodiments of the present technology.

FIG. 4 shows exemplary methods 400 according to embodiments of the present technology. More than one method is considered shown because various subsets of the operations shown can be implemented separately, in any combination, without departing from the scope of the present disclosure.

It should be understood that the steps, operations, or functions of the methods 400 are not necessarily presented in any particular order and that performance of some or all the steps in an alternative order is possible and is contemplated. The methods can also be combined or overlap, such as one or more steps of one of the methods being performed in the other method.

The steps have been presented in the demonstrated order for ease of description and illustration. Steps can be added, omitted and/or performed simultaneously without departing from the scope of the appended claims. It should also be understood that the illustrated methods 400 can be ended at any time.

In certain embodiments, some or all steps of the processes 400 and/or substantially equivalent steps are performed by a processor, e.g., computer processor, executing computer-executable instructions stored or included on a computer-readable medium, such as the data storage device 104 of the system 100 described above.

In various embodiments, the system can have default organization of gestures available to use, such as pointing, or virtual grabbing, swiping, pushing, throwing, the like, or other. In some embodiments, these options are presented to the user as instructions or options that the user can select in customizing the system. Selection can be stored to the user profile mentioned.

User gestures, in various embodiments, are sensed by a sensor of a user-worn wearable device and/or the vehicle.

At block 410, the user is wearing or holding a mobile device, such as a smart wearable device, like that shown in FIGS. 3, 6, and 7. Example mobile and wearable devices are described above.

As provided, in some embodiments, the technology is configured for operation whether a user mobile device is worn, carried, or used in the process. User motion can be sensed by vehicle cameras, for instance, along with or instead of by a mobile device.

At block 412, user disposition is determined. The user is in the vehicle, near or proximate the vehicle, or approaching, entering, or exiting the vehicle. In some embodiments, the vehicle determines that the user is nearby determining that the user wearable device is proximate, such as by being able to receive a short range wireless signal or message form the wearable device. User position is in some embodiments determined by one or more vehicle sensors, such as a camera or radar.

At block 414, for implementation involving the user wearable device, or other user mobile device, the vehicle communicates with the device. The mobile device can based on the connection, begin a program at the device to begin, or be prepared to begin, sensing user movement, such as a smart watch measuring hand or arm movement, or smart eyeglasses measuring head movement.

For the implementations in which the vehicle measures user movement, the vehicle can at this stage begin monitoring user movement to detect a gesture by which the user is attempting to control a vehicle function.

At block 416, the vehicle computing system determines whether there is any situation warranting notification to the user, such as a driving or driving-environment situation. In the scenario mentioned above, if the user is using a navigation application operating at or through the vehicle, the vehicle can here determine that the user should be notified of an upcoming right turn.

As another example, the vehicle may determine that the user should be advised of an obstacle, traffic issue, or road hazard, such as a large pothole, an accident, other stopped traffic, a traffic light, etc., being approached. In some embodiments, the output to the user is handed, or provided at purposeful spatial context, such as by providing a vibration or tone to a right template portion of eyeglasses if the hazard or situation—e.g., direction of needed turn per navigation—being advised of is toward the right of the user. The arrangement can also consider spatial context outside of left/right, such as fore/aft. If a hazard is behind the car, the vehicle signal may be configured to cause wearable eyeglasses to provide vibration at the temples, and to cause the frame portions to provide the vibration if the hazard is in front.

The type of communication determined for providing to the user can correspond to the information needing to be communicated by the vehicle to the user. The type of communication selected can include the mode—e.g., haptic and/or audio. As another example, the type of communication can include the level or quality of the communication, such as frequency or amplitude of a haptic output, a tempo or volume of an audible output, or an amount, color, pattern, blinking, rate, or the like for visual output.

Again, in contemplated embodiments the output can include text, images, icons, or the like, such as provided via a lens of smart glasses or smart bracelet.

At block 418, the vehicle computing system interacts with the user and therein determines any output that should be provided to the user. The interaction can be performed via vehicle-wearable device communications, or via one or more sensors of the vehicle sensing user body motion. In various embodiments, the wearable device senses user motion and transmits communication to the vehicle indicated the motion determined.

Example gestures are described above, such as: the user pointing to an infotainment app icon displayed at a vehicle display screen; the user pointing to a radio system of the vehicle and in the air turn the user hand to simulate turning a knob, or swipe in the air slowly, to indicate a desire to change a radio station; or the user pointing to an HVAC system and making a pre-determined gesture to adjust the HVAC system—e.g., temperature, fan speed, etc.

Regarding the output determined at step 418, as with the block 416, the type of output communication determined for providing to the user can correspond to the reason needing to be communicated by the vehicle to the user. The output is in various embodiments a simply, slight communication, such as a low level, single, vibration, tone, or visible indication, to confirm to the user that their most recent input is received.

As also mentioned, in a contemplated embodiments, a communication is provided to the user to confirm to the user that they have engaged the gesture recognition program of the wearable device and/or vehicle. In the radio example, for instance, after a user directs their finger or hand toward the radio, and perhaps after they hold it generally in that disposition for a second or two (depending on the system programming or user preference added thereto), the system will give a gentle output—e.g., vibration, tone, etc.—to advise the user that the gesture recognition is engaged and has recognized their hand. Thereby, the user proceeds to perform the gesture with confidence knowing that they system is monitoring their gesture.

At block 420, the vehicle obtains information that is pertinent to the user, and provides an output to the user wearable device accordingly. The information may be received via the Internet or a server or cloud computing system, for instance. As an example, the vehicle may receive weather information about a flooded road being approached. This example overlaps with the prior block 418 operations, a difference being that in this case the information about the situation was received by the vehicle from an extra-vehicle source, such as another vehicle (V2V), roadside infrastructure (V2I), or other (V2X).

At block 422, the vehicle provides to the user wearable device a signal indicating the output determined at prior operations. The output such as but not limited to that of the prior three blocks 416, 418, 420. The suitable output determined is determined and provided in various embodiment with consideration given to the situational and special contact—e.g., right/left, fore/aft.

At block 424, the wearable device delivers the output from block 422.

At block 426, the user may communicate back to the vehicle. This communication can be, but in all implementations does not have to be, provided from the user by way of the user wearable device.

Communications from the user via the wearable device can be provided by way of gesture or otherwise.

The method 400 can end or any one or more operations of the method 400 can be performed again.

V. Example System Inputs and Outputs—FIG. 5

Figure 5:
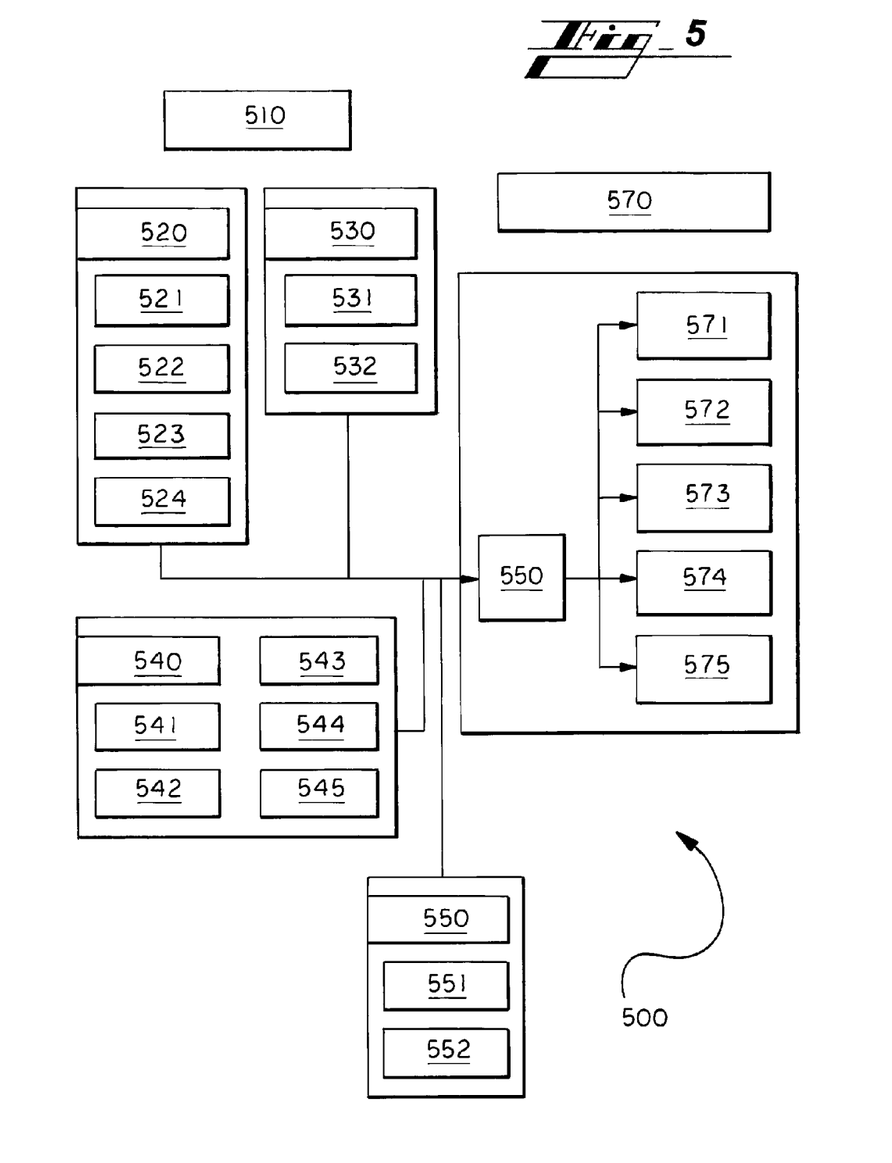
FIG. 5 shows example system inputs and outputs, according to embodiments of the present technology.

FIG. 5 shows example arrangement 500 including system inputs 510, the vehicle processor 560 and outputs 570, according to embodiments of the present technology.

The inputs 510 can be divided into four groups: wearable device inputs 520, off-board inputs 530, on-board vehicle inputs 540, brought-aboard device inputs 550.

The wearable device inputs 520 include but are not limited to signals or messages from the user wearable device indicating user gestures sensed by the wearable device. Other potential input includes form the wearable device include communications initiated by the user or a wearable device advising the vehicle of user settings, preferences, instructions or the like.

FIG. 5 indicates schematically various types of wearable devices: smart watch 521, smart glasses 522, smart bracelet 523, or other 524.

The off-board inputs 530 can include any input from outside of the vehicle that directs or otherwise influences output provided by the vehicle to the user via the user wearable device.

Examples include and are not limited to the remote sources 531 such as the Internet, satellites, servers or cloud resources, or other resources 532 external to the vehicle, such as from other vehicles (V2V), adjacent-vehicle infrastructure (V2I), or other (V2X).

The on-board vehicle inputs 540 include and are not limited to: vehicle switches 541 actuated by the user, vehicle cameras 542 sensing user presence or movement, a vehicle application 543 such as a navigation application, vehicle safety systems 544, and other vehicle sensors 545. The inputs 540 can thus include input from vehicle back up sensors, following sensors measuring distance to a preceding vehicle or object, etc.

The brought-aboard device inputs 550 include inputs from any device that is not intrinsic to the vehicle. This can include the user wearable, but inputs from that device are generally considered under the first inputs 520.

Example brought-aboard device inputs 550 include a user phone 551 and another digital device 552 such as an MP3 or other media player.

The vehicle 102 computing device 100 or processor thereof is indicated by reference numeral 510 in FIG. 5. The processor receives the inputs from the sources mentioned, and determines appropriate output to provide to the user. As provided, in various embodiments the output is eventually provided to the user via the user wearable device 571.

The signal or message provided to the user wearable device 571 can include any of those provided herein, such as haptic, audible, and visual. And the output ordered can be sensitive to context, such as by being spatially or otherwise situationally focused. The output can require left or right, or fore/aft, actuation of a wearable output components(s), for instance, or be tailored by level to the situation, such as provided at a high, medium, or low tempo, volume, frequency, amplitude, or other level. In various embodiments the output can include text, images, icons, or the like, provided via a lens of smart glasses or smart bracelet, for instance.

Other example output modalities include vehicle components, such as a vehicle display 572, a vehicle audio component 573, vehicle haptic component 574, or vehicle lighting component 575.

VI. First Example Implementation—FIG. 6

FIG. 6 shows an example implementation 600, involving the wrist-mounted wearable device 300 of FIG. 3.

In the first section 610, a user hand 601 is shown pointing to the display screen 602. The wearable device and/or the vehicle orientation and sensing systems can be sensitive enough to determine not only that the user is pointing to the screen 602, but the particular part of the screen they are pointing to, such as a particular section or icon.

For some embodiment, in the first section 610, the vehicle also provides a confirmation output to the user, such as via the user wearable device, and/or via a vehicle component—screen, tone, icon, light, change of heads-up display (HUD), etc.—to confirm to the user that the system has sensed the user preparing to make a gesture—e.g., the vehicle sensing that the user hand is up and pointed toward the HUD poised to make a gesture.

In the second section 620, the wearable and/or vehicle then determine the user gesture, such as a finger swipe, hand twist, etc. The vehicle in various embodiments sends a confirmation output to the user to confirm that the gesture was recognized.

At this point, the vehicle can provide a confirmation output to the user, such as via the user wearable device, and/or via a vehicle component—screen, tone, icon, light, change of heads-up display (HUD), etc.—to confirm to the user that the system has sensed the gesture and is performing the corresponding function.

In the third section 630, the vehicle system, if needed, initiates performance of a vehicle function corresponding to the gesture. Example functions include adjusting the radio, HVAC, starting 632, pausing, or stopping media, etc. If the output to the user is simply to notify the user of a situation, such as a needed right turn, the vehicle might not need to initiate any vehicle functions.

VII. Second Example Implementation—FIG. 7

FIG. 7 shows another example implementation 700, involving smart sunglasses 702.

In a first section 710, the vehicle computing system determines that an output to the user regarding driving or navigation should be provided to the user. The view 700 shows a navigation map 712 and an image 714 showing an upcoming turn. Each view may be presented to the user, such as via a vehicle HUD.

In the second section 720, the user wearable 702 connects communicatively with the vehicle to enable communications between them. The connection can be via Bluetooth protocol, or other. The connecting operations 720 can include handshake or authentication procedures.

In the third section 730, the vehicle computing system determines what signal and/or message to provide to the user regarding the situation identified in the first section 710. An example indication is the needed right turn 714 to be made by the driver in order to follow the routing 712.

The view 700 also shows in the third section 730 a visual representation 731 showing various types of output corresponding to the context of the situation.

One type of context is spatial, and particularly directional. The first column 732 shows that the signal from the vehicle to the wearable advises the wearable to actuate—e.g., vibration and/or sound to—a right side of the eyeglasses 702, as indicated by dot 733.

The second column 734 show three various types of output corresponding to three distances 735 that the vehicle will have with respect to the corner at which the user should turn the vehicle. The first type of output 735 is a low level output, such as by being including only a single vibration and/or tone, or an output at a low frequency, low volume, low amplitude, brightness, etc. This low level output 735 corresponds to a farther distance from the corner, such as 800 feet, at which the user should turn.

The second output 736 is an intermediate or medium level. The intermediate level output 736 is provided when the vehicle is closer to the turn, such as 400 feet from the corner. The medium level output 736 is in one or more ways at a higher level, such as by being configured to be more attention grabbing, than the lower level 735. For example, the second type of output 736 can provide more than one vibration and/or tone, such as a quick double vibration or beep, or an output at a medium (higher than the low output 735) frequency, volume, amplitude, brightness, etc.

The third output 737 is a high level. The high level output 737 is provided when the vehicle is even closer, for example, imminent, to the turn, such as 100 feet from the corner. The high level output 737 is in one or more ways at a higher level, such as by being configured to be more attention grabbing, than the lower and medium levels 735, 736. For example, the high type of output 737 can provide more than two vibrations or beeps, or an output at a higher level than that of the low and medium outputs 735, 736, such as regarding frequency, volume, amplitude, brightness, etc.

VIII. Additional Features

Many of the features and embodiments of the present technology are described above. The present section restates some of those and references some others.

In various embodiments, the present technology enables access and control of features of existing vehicles and consumer wearable devices in order to augment the vehicle human-machine, or vehicle-human, interface (HMI, VHI), thereby providing an enhanced user experience.

In various embodiments, the present technology includes interfacing with many types of wearable devices such as smart watches, glasses, wristbands, necklaces, hats, shirts, etc.

Relevant vehicle systems can include information, communication, navigation, safety, and/or other.

In various embodiments, the present technology is configured with suitable communication protocols and/or programming interfaces (e.g., APIs), at the wearable device and/or at the vehicle, to communicate with each other. The vehicle system can be configured to be able to communicate with any or all of a wide variety of wearable devices.

In various embodiments, the present technology uses existing features (audio/visual/haptic) of consumer wearable devices for the novel functionality of the present technology, including the advanced vehicle-user interactions described herein. The arrangement can, for instance, use haptic motor(s) of a smart-watch to provide appropriate feedback when the user touches/gestures/interacts with the vehicle HMI.

Or the arrangement can, for instance, use haptic motors in smart-glasses to provide direction and distance information in a turn-by-turn navigation system.

Or the arrangement can, for instance, use sound transducers of a smart hearing device (e.g., earbuds or earrings) to provide appropriate feedback when the user touches/gestures/interacts with the vehicle HMI.

Or the arrangement can, for instance, use sound transducers of a smart hearing device (e.g., earbuds or earrings) to provide direction and distance information in a turn-by-turn navigation system.

In various embodiments, the present technology uses a wearable device to augment embedded vehicle components such as an in-vehicle HMI system.

In various embodiments, the present technology enables access and control of features (audio/visual/haptic) in consumer wearable devices.

In various embodiments, the present technology uses wireless communication to access and control features (audio/visual/haptic) of wearable devices in order to augment the vehicle HMI thereby providing an enhanced user experience.

In various embodiments, the present technology enables utilization and control of wearable device to augment the embedded vehicle HMI system.

In various embodiments, the present technology enables seamless input/output communication between users' wearable electronic device and other systems such as vehicle systems. Example vehicle systems include infotainment, navigation, and safety. Other systems include, for instance, the internet/cloud, remote control centers (e.g., Onstar®), other vehicles (vehicle-to-vehicle (V2V), infrastructure (V2I; e.g., roadside), or other (V2X), etc.

The technology in various embodiments includes an app that enables vehicle and wearable device communication to leverage gesture control capability inside, outside and around the vehicle, or during a transition, such as when a parent is securing a child into a car seat or reaching in the trunk.

The app can be provisioned at the wearable device and/or at the vehicle. The wearable device can be functional with (e.g., paired or pairable) multiple vehicles. In this way a user can use the technology with each of multiple vehicles in their household, or with rental vehicles, for instance.

The app and wearable device combine to enhance the user experience, including added convenience, comfort, property security, and personal security.

The wearable devices can be ornamental or fashionable, such as the devices looking like they are not clearly HMI products.

IX. Select Advantages

Many of the benefits and advantages of the present technology are described above. The present section restates some of those and references some others. The benefits described are not exhaustive of the benefits of the present technology.

In various embodiments, the technology provides an enhanced user interface, including to the vehicle, and improved overall vehicle-use experience.

The present technology can be used with any of a wide variety of vehicle system, such as information, infotainment, communication, navigation, safety, or other.

Cost, vehicle mass, packaging, or integration associated with adding embedding new components to the vehicle can be avoided in most cases. For example, for embodiments including wearable devices, additional cost, mass, packaging, and integration typically needed to incorporate sensors for related purposes (e.g., user identification or user gesture detection/determination) directly into the vehicle is avoided.

The wearable devices can be ornamental or fashionable, such as the devices looking like they are not clearly HMI products.

The systems and methods of the present disclosure allow safer and more convenient use of a system such as an automobile.

X. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed is:

1. A transportation vehicle system, for providing feedback to a user-worn wearable device, comprising:
    a hardware-based processing unit;
    a hardware-based computer-readable storage device comprising:
        a vehicle-function identification module that, when executed by the processing unit:
            determines that a trigger condition has occurred, wherein the trigger condition indicates a need to make a vehicle-driving maneuver; and
            determines, for responding to the trigger condition, a wearable-communication function including transmitting a vehicle signal to the wearable device, wherein the vehicle signal is configured to notify the user by way of wearable-device actuation of the vehicle-driving maneuver needed; and
        an activation module that, when executed by the processing unit, initiates transmitting the vehicle signal to the wearable device.

2. The transportation vehicle system of claim 1 wherein the trigger condition includes the processor receiving from the wearable device a signal or message indicating that a user gesture has been sensed at the wearable device.

3. The transportation vehicle system of claim 2 wherein the vehicle signal is configured to cause the wearable device to actuate to advise the user that the gesture is recognized by the transportation vehicle system.

4. The transportation vehicle system of claim 1 wherein:
    the trigger condition includes determining that a user gesture has been made; and
    the processing unit, in determining that the user gesture has been made, receives a sensor signal indicating the user gesture from a vehicle sensor.

5. The transportation vehicle system of claim 1 wherein the trigger condition includes a user wearing the wearable device moving a user body part to a pre-gesture disposition at which the user does not contact the vehicle with the body part.

6. The transportation vehicle system of claim 5 wherein the vehicle signal is configured to cause the wearable device to actuate to advise the user that the pre-gesture disposition is recognized by the transportation vehicle system.

7. The transportation vehicle system of claim 1 wherein the vehicle-function identification module, when executed by the processing unit, determines a need to activate or change a vehicle apparatus indicated by a user gesture.

8. The transportation vehicle system of claim 7 wherein the vehicle apparatus is selected from a group consisting of an infotainment application, a radio apparatus, a heating, ventilating, and air-conditioning apparatus, a navigation apparatus, and a safety apparatus.

9. The transportation vehicle system of claim 1 wherein the vehicle signal, being configured to notify the user by way of wearable-device actuation of the needed vehicle driving maneuver, is configured with one or more contextual indicators, to indicate to the user via wearable-device actuation context relating to the driving maneuver needed.

10. The transportation vehicle system of claim 9 wherein the one or more contextual indicators includes a directional indicator or an importance-level indicator.

11. A transportation vehicle system, for providing feedback to a user-worn wearable device, comprising:
   a hardware-based processing unit;
   a hardware-based computer-readable storage device comprising:
     a vehicle-function identification module that, when executed by the processing unit:
       determines that a trigger condition has occurred, wherein the trigger condition indicates a need to make a vehicle-driving maneuver; and
       determines, for responding to the trigger condition, a wearable-communication function including transmitting a vehicle signal to the wearable device, wherein the vehicle signal is configured with one or more contextual indicators, to indicate to the user via wearable-device actuation context relating to the driving maneuver needed; and
     an activation module that, when executed by the processing unit, initiates transmitting the vehicle signal to the wearable device.

12. A transportation vehicle system, for providing feedback to a user-worn wearable device, comprising:
   a hardware-based processing unit;
   a hardware-based computer-readable storage device comprising:
     a vehicle-function identification module that, when executed by the processing unit:
       determines that a trigger condition has occurred; and
       determines, for responding to the trigger condition, a wearable-communication function including transmitting a vehicle signal to the wearable device, wherein:
         the vehicle signal is configured with one or more contextual indicators, to indicate to the user, via wearable-device actuation, context relating to a driving maneuver needed; and
         the one or more contextual indicators including a directional indicator or a selected importance-level indicator of multiple pre-established importance-level indicators; and
     an activation module that, when executed by the processing unit, initiates transmitting the vehicle signal to the wearable device.

\* \* \* \* \*